United States Patent [19]
Hessel et al.

[11] Patent Number: 5,473,008
[45] Date of Patent: Dec. 5, 1995

[54] CASTING COMPOSITION FOR PRODUCING GREEN CERAMIC SHEETS CONTAINING POLYVINYL ALCOHOL/FATTY ACID ESTER AS DISPERSANT

[75] Inventors: Friedrich Hessel, Mainz; Katharina Seitz, Frankfurt am Main; Andreas Roosen, Hofheim; Gerhard Wegner; Wolfgang Meyer, both of Mainz; Wolfgang Sigmund, Filderstadt, all of Germany

[73] Assignee: Hoechst Aktiengesellschaft, Frankfurt am Main, Germany

[21] Appl. No.: 245,534

[22] Filed: May 18, 1994

[30] Foreign Application Priority Data

May 20, 1993 [DE] Germany .................. 43 16 924.4

[51] Int. Cl.$^6$ .................. C08L 33/06; C08K 3/10; B32B 18/00
[52] U.S. Cl. .................. 524/561; 524/396; 524/427; 524/444; 524/560; 524/599; 523/116; 428/325; 428/339
[58] Field of Search .................. 524/396, 427, 524/444, 560, 599, 561; 523/116; 428/325, 339

[56] References Cited

U.S. PATENT DOCUMENTS 4,540,677 9/1985 Enomoto et al. .................. 501/151
5,057,360 10/1991 Osaka et al. .................. 524/444

FOREIGN PATENT DOCUMENTS 0144155 6/1985 European Pat. Off. ..
0346073 12/1989 European Pat. Off. ..
0383605 8/1990 European Pat. Off. ..
4003198 8/1991 Germany .

OTHER PUBLICATIONS

R. E. Mistler,—Tape Casting of Ceramics, Wiley & Sons, New York, 1978, pp. 411–425.

Primary Examiner—Paul R. Michl
Assistant Examiner—Olga Asinovsky
Attorney, Agent, or Firm—Foley & Lardner

[57] ABSTRACT

The invention relates to a casting composition comprising a ceramic powder, an organic solvent, binder, plasticizer and a dispersant, which composition is suitable for producing green ceramic sheets by the tape casting process. The dispersant present in the casting composition of the invention is a polyvinyl alcohol/fatty acid ester having a degree of conversion in the range from 50 to 100%. The invention also relates to the use of such a casting composition for producing ceramic green sheets and a process for producing ceramic substrates using a green sheet thus produced.

20 Claims, No Drawings

CASTING COMPOSITION FOR PRODUCING GREEN CERAMIC SHEETS CONTAINING POLYVINYL ALCOHOL/FATTY ACID ESTER AS DISPERSANT

The present invention relates to a casting composition for producing green ceramic sheets, which contains a polyvinyl alcohol/fatty acid ester as dispersant, and also shaped bodies produced therefrom.

The tape casting process essentially provides for the dispersion of fine ceramic and inorganic powder in a dispersion medium, advantageously with the simultaneous further addition of binders and plasticizers. The casting composition so formed is cast onto a moving carrier surface and there forms a layer of very uniform thickness. After evaporation of the dispersion medium, a more or less flexible sheet is obtained which can be further processed into green shaped parts by cutting, stamping, embossing or stacking; the shaped parts are then subsequently subjected to a sintering process.

The first step in the development of a tape casting process is the correct selection of the appropriate organic additives for producing a ceramic slip which forms the most important prerequisite for the production of high-quality ceramic.

To achieve a high packing density of the powder particles in the green sheet, dispersants are added to the powder/solvent mixture. The coating of the surface of the powder with the dispersant achieves complete deagglomeration and stabilization against sedimentation in the workup process. The buildup of a repulsive potential between the particles leads to a lower slip viscosity with simultaneously high solids content. A high solids content in the ceramic slip gives a high packing density in the green sheet and thus a low shrinkage on firing the green sheet to produce the ceramic components.

Various dispersants are known for organic solvents. Natural products or modified natural products, for example fish oil, are frequently used (R.E. Mistler et al., Tape Casting of Ceramics, Wiley and Sons, New York, 1978). However, these raw materials have variable properties, which is why synthetic products which do not have these variations are sought.

Polyvinyl alcohol esters are known in the literature. Thus, for example, EP-A-0 144 155 describes the use of a graft-copolymer based on a polyvinyl alcohol polymer for preparing an agent which serves to coat paper with a protective surface coating.

Also known is the use of polyvinyl alcohol/fatty acid esters as edible or palatable fat or oil substitute for foodstuffs or in the pharmaceutical industry (EP-A-0,383,605).

It is an object of the present invention to provide a casting composition which can be prepared with constant, reproducible, low viscosity and which is suitable for manufacturing green ceramic sheets by the tape casting process.

The present invention achieves this object and provides a casting composition for producing green ceramic sheets by the tape casting process, comprising a ceramic powder, an organic solvent, binder, plasticizer and a polyvinyl alcohol/fatty acid ester having a degree of conversion $\geq 50\%$ as dispersant.

Polyvinyl alcohol/fatty acid esters suitable as dispersant for the casting composition of the invention contain from 8 to 24, preferably from 12 to 18, carbon atoms, based on the fatty acid radical, and can be saturated or monounsaturated to polyunsaturated.

The polyvinyl alcohol used can be a commercial product, such as for example ®Mowiol, Hoechst AG. Preference is given to using partially hydrolyzed grades having a degree of saponification of from 70 to 92% or fully hydrolyzed polyvinyl alcohols having a degree of saponification $\geq 98\%$, the degree of polymerization being, in particular, in the range from 250 to 2,000.

By selecting the ratio of OH groups in the polymer to the proportion of fatty acid, products having complete conversion or incomplete conversion with fatty acids can be obtained. In this way, free OH groups can be present in the polymer. The degree of conversion, i.e. the ratio of the fatty acid content to the sum of the free OH groups and fatty acid content in the converted polyvinyl alcohol, is from 50 to 100% according to the invention. Products having a lower degree of conversion are only incompletely soluble or in some cases even insoluble in the solvents used.

Fatty acids which may be mentioned are, in particular, isostearic acid, lauric acid, linolenic acid, palmitic acid, stearic acid, oleic acid, linoleic acid and arachidic acid.

The reaction of the polyvinyl alcohol with the fatty acid is carried out by methods known to those skilled in the art of polymers. The fatty acid, which is present in the form of the acid chloride, is esterified with the polyvinyl alcohol in pyridine or triethylamine as solvent with removal of the amine/HCl salt which forms, or the fatty acid is admixed with the polyvinyl alcohol and esterified azeotropically.

The polyvinyl alcohol/fatty acid ester is added in an amount of from 0.3 to 5% by weight, based on the ceramic powder. According to the invention, mixtures of various fatty acid esters can also be used.

The solvents used for the casting composition of the invention are preferably volatile organic solvents such as, for example, methanol, ethanol, isobutyl alcohol, methyl ethyl ketone, trichloroethylene or toluene, and also mixtures of these solvents. In a preferred embodiment, a mixture of trichloroethylene and ethanol is used. The proportion of solvent, based on the total weight of the casting composition, is preferably from 15 to 30% by weight.

Ceramic materials which are suitable for the casting composition of the invention are metal oxides or nonoxides which customarily play a role in the production of ceramic shaped parts. The ceramic powders can be used either alone or in mixtures. Particularly typical ceramic powders include the oxides, carbides, nitrides, borides and sulfides of lithium, potassium, beryllium, magnesium, boron, aluminum, silicon, copper, calcium, strontium, barium, zinc, cadmium, gallium, indium, titanium, zirconium, bismuth or manganese. The specified ceramic powders can, according to the invention, be present in the casting composition in amounts of from 60 to 80% by weight, preferably from 65 to 75% by weight, in each case based on the total weight of the casting composition.

The binders which are suitable for the casting composition of the invention are added in an amount of from 2 to 10% by weight, based on the total weight of the casting composition. Thus, the binders used can be, for example, polyacrylates, polymethacrylates or polyvinyl formals; preference is given to using polyvinyl butyral.

Furthermore, it is advantageous for the casting composition to contain plasticizers, for example esters of a dicarboxylic acid, such as phthalic acid, adipic acid or sebacic acid, with aliphatic and/or aromatic monohydric alcohols such as butanol, hexanol and benzyl alcohol or esters of these alcohols with phosphoric acid or esters of monocarboxylic acids with polyhydric alcohols. In a preferred embodiment, dioctyl phthalate is used in a proportion of, in particular, from 0.5 to 5% by weight, based on the total weight of the casting composition.

The ceramic powder particles are stabilized in solution by the polyvinyl alcohol/fatty acid ester and sedimentation of the particles is thus prevented. The casting composition of the invention containing polyvinyl alcohol/fatty acid esters as dispersant can be produced with a constant, low, reproducible viscosity in the range from 1,500 to 20,000 mPa·s, preferably from 3,000 to 12,000 mPa·s, measured at a temperature of 20° C.

Casting and drying the casting composition of the invention comprising a finely divided inorganic powder, an organic solvent, a binder, a plasticizer and a polyvinyl alcohol/fatty acid ester having a degree of conversion a 50% as dispersant gives ceramic sheets having a high green density and thus low shrinkage on sintering.

By thermal treatment and sintering of the green sheets thus produced, ceramic substrates can be produced.

The dispersing action of the polyvinyl alcohol/fatty acid esters is illustrated by the examples below, but without being limited to the concrete embodiments presented.

EXAMPLE 1

4 parts by weight of polyvinyl alcohol (PVA) ester (PVA/isostearic acid ester, degree of conversion 100%, no OH band observable in the IR) are dissolved in 137 parts by weight of trichloroethylene/ethanol (azeotropic mixture) and 400 parts by weight of $Al_2O_3$ powder ($d_{50}$ 2.9 µm) are added. The mixture is processed in a ball mill for a period of 48 hours. The slip obtained is degassed in vacuo and the viscosity at 20° C. is determined ("Haake Rotovisko" from Haake). The viscosity values for two different shear rates are shown in Table 1.

EXAMPLE 2

2 parts by weight of polyvinyl alcohol/isostearic acid ester are dissolved in 137 parts by weight of trichloroethylene/ethanol, 400 parts by weight of $Al_2O_3$ are added and the mixture is processed and the viscosity determined as described in Example 1.

EXAMPLE 3

4 parts by weight of fish oil (Menhaden fish oil "Defloc Z3", Spencer Kellog Div. Textron Inc., Buffalo, N.Y.) are processed with 400 parts by weight of $Al_2O_3$ in trichloroethylene/ethanol and the viscosity determined as described in Example 1.

EXAMPLE 4

137 parts by weight of trichloroethylene/ethanol as azeotropic mixture are initially charged and processed with 400 parts by weight of $Al_2O_3$ as described in Example 1 (without dispersant). The ceramic powder immediately settles on allowing the slip to stand, so that a viscosity measurement is not possible.

TABLE 1

Dispersing action of PVA ester
Viscosity (in mPa · s) at various shear rates

|  | Viscosity [50 1/s] | [600 1/s] |
| --- | --- | --- |
| Example 1 | 119 | 50 |
| Example 2 | 177 | 76 |
| Example 3 | 103 | 45 |
| Example 4 | not measurable/ | |

TABLE 1-continued

Dispersing action of PVA ester
Viscosity (in mPa · s) at various shear rates

|  | Viscosity [50 1/s] | [600 1/s] |
| --- | --- | --- |
| sedimentation | | |

Production of a sheet 686 parts by weight of trichloroethylene/ethanol as azeotropic mixture are charged into a ball mill, 20 parts by weight of PVA/isostearic acid ester are dissolved therein, 2,000 parts by weight of $Al_2O_3$ powder ($d_{50}$ 2.9 µm) are added and the mixture is processed for a period of 48 hours. Subsequently 70 parts by weight of PVB (polyvinyl butyral, commercial, for example ®Mowital B 40 H, manufactured by Hoechst AG) and 45 parts by weight of a plasticizer (for example ®Palatinol AH, manufactured by BASF) are added and the mixture is homogenized for 24 hours. The slip obtained is degassed in vacuo and subsequently characterized by viscosity measurement. The slip is then cast by the doctor-blade process on a laboratory casting facility and dried in a countercurrent of air. The dried sheet is taken off the tape. Parts are stamped out of the continuous sheets and fired in a furnace at 1600° C.

The green sheet is characterized by the green density, the sintered part by the sintered density. The sintered density is determined by the Archimedes (buoyancy) principle, the green density by exact measurement and weighing.

The strength of the green sheet is determined using a tensile tester (from Instron), and a drawing speed of 50 mm/min on a strip 15 mm wide and 15 cm long.

It can be seen from Table 2 that the PVA/fatty acid ester has comparable properties in the slip and the green sheet to those of the known fish oil dispersant.

The comparative examples using fish oil and without dispersant were carried out as described for processing with PVA ester.

TABLE 2

|  | Viscosity [in mPa · s] at 50 1/s | Green density [g/cm³] | Shrinkage [%] | Sintered density [g/cm³] | Strength [MPa] |
| --- | --- | --- | --- | --- | --- |
| PVA ester | 3550 | 2.43 | 17.1 | 3.75 | 0.9 |
| Fish oil | 3450 | 2.44 | 17.0 | 3.75 | 1.0 |
| — | 7300 | 2.35 | 18.4 | 3.73 | 1.8 |

We claim:

1. A casting composition suitable for producing green ceramic sheets comprising a ceramic powder, an organic solvent, a binder, a plasticizer, and a dispersant comprising a polyvinyl alcohol/fatty acid ester having a degree of conversion in the range from 50 to 100%.

2. Casting composition as claimed in claim 1, wherein the polyvinyl alcohol/fatty acid ester comprises fatty acid radicals having from 8 to 24 carbon atoms.

3. Casting composition as claimed in claim 2, wherein the polyvinyl alcohol/fatty acid ester comprises as ester component radicals of isosteric acid, lauric acid, linolenic acid, palmitic acid, stearic acid, oleic acid, linoleic acid or arachidic acid.

4. Casting composition as claimed in claim 1, wherein the organic solvent comprises a mixture of ethanol and trichloroethylene.

5. Casting composition as claimed in claim 1, wherein the binder comprises polyvinyl butyral.

6. Casting composition as claimed in claim 1, wherein the plasticizer comprises dialkyl phthalate.

7. Casting composition as claimed in claim 6, wherein the dialkyl phthalate is dioctyl phthalate.

8. Casting composition as claimed in claim 1 having a viscosity in the range from 1,500 to 20,000 mPa·s, when measured at a temperature of 20° C.

9. Casting composition as claimed in claim 8 having a viscosity in the range from 3,000 to 12,000 mPa·s, when measured at a temperature of 20° C.

10. Casting composition as claimed in claim 1, wherein the ceramic powder is present in an amount from 60 to 80% by weight, calculated on total weight of the casting composition.

11. Casting composition as claimed in claim 1, wherein the organic solvent is present in an amount from 15 to 30% by weight, calculated on total weight of the casting composition.

12. Casting composition as claimed in claim 1, wherein the binder is present in an amount from 2 to 10% by weight, calculated on total weight of the casting composition.

13. Casting composition as claimed in claim 1, wherein the plasticizer is present in an amount from 0.5 to 5% by weight, calculated on total weight of the casting composition.

14. Casting composition as claimed in claim 1, wherein the dispersant is present in an amount from 0.3 to 5% by weight, calculated on total weight of the casting composition.

15. Method for the preparation of a ceramic green sheet by casting a casting composition as claimed in claim 1 onto a casting facility and drying the casted composition to give the ceramic green sheet.

16. Process for the production of a predominantly flat ceramic substrate by thermal treatment and sintering a ceramic green sheet prepared as set forth in claim 15.

17. A ceramic green sheet produced by a method as claimed in claim 15.

18. A ceramic substrate produced by a method as claimed in claim 16.

19. Casting composition as claimed in claim 1, wherein the polyvinyl alcohol used to form the ester is partially hydrolyzed having a degree of saponification of 70 to 92%.

20. Casting composition as claimed in claim 1, wherein the polyvinyl alcohol used to form the ester is fully hydrolyzed having a degree of saponification of $\geq 98\%$.

* * * * *